(12) United States Patent
Geiger et al.

(10) Patent No.: US 10,066,745 B2
(45) Date of Patent: Sep. 4, 2018

(54) TRANSMISSION DEVICE AND METHOD FOR OPERATING THE SAME

(71) Applicant: ZF Friedrichshafen AG, Friedrichshafen (DE)

(72) Inventors: Simon Geiger, Oberteuringen (DE); Matthias Madlener, Hohentengen (DE); Sven Bieber, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 63 days.

(21) Appl. No.: 15/413,523

(22) Filed: Jan. 24, 2017

(65) Prior Publication Data

US 2017/0211694 A1 Jul. 27, 2017

(30) Foreign Application Priority Data

Jan. 25, 2016 (DE) .................. 10 2016 200 989

(51) Int. Cl.
*F16H 61/40* (2010.01)
*F16H 47/02* (2006.01)

(52) U.S. Cl.
CPC ............. *F16H 61/40* (2013.01); *F16H 47/02* (2013.01)

(58) Field of Classification Search
CPC ....................................................... F16H 61/40
See application file for complete search history.

(56) References Cited

U.S. PATENT DOCUMENTS

| | | | | | |
|---|---|---|---|---|---|
| 3,667,226 | A | * | 6/1972 | Asmus | F16H 61/40 60/489 |
| 3,983,701 | A | * | 10/1976 | Jennings | F16H 61/40 60/465 |
| 2009/0005941 | A1 | * | 1/2009 | DeMarco | F16H 61/10 701/51 |

FOREIGN PATENT DOCUMENTS

| | | | |
|---|---|---|---|
| DE | 196 41 723 A1 | 6/1997 | |
| DE | 10 2013 215 520 A1 | 2/2015 | |
| GB | 1062253 | * 3/1967 | ............. F16H 61/40 |

OTHER PUBLICATIONS

German Search Report Corresponding to 10 2016 200 989.3 dated Nov. 18, 2016.

* cited by examiner

*Primary Examiner* — Tisha D Lewis
(74) *Attorney, Agent, or Firm* — Davis & Bujold PLLC; Michael J. Bujold

(57) ABSTRACT

A power-split transmission device for a vehicle, which connects a drive engine to a drive output, having a hydrostatic unit for continuous adjustment of the transmission ratio at a transmission unit, and two range clutches that alternately operate for respectively associated driving ranges with different transmission ratios. A control unit, during regular vehicle deceleration, implements the driving range change from a first range, with higher transmission ratios, to a second range, with lower transmission ratios, by switching from the first to the second range clutch in accordance with a synchronous point dependent deceleration control logic. In the special case of an unexpected increase of the deceleration dynamic at the beginning of an already initiated driving range change from the first to the second driving range, the control unit immediately forces the change by bypassing the (Continued)

synchronous point dependent deceleration control logic when other boundary conditions are fulfilled.

14 Claims, 2 Drawing Sheets

TRANSMISSION DEVICE AND METHOD FOR OPERATING THE SAME

This application claims priority from German patent application serial no. 10 2016 200 989.3 filed Jan. 25, 2016.

FIELD OF THE INVENTION

The invention concerns a power-split transmission device for a vehicle and a method for operating such a transmission device, which can in particular be used in a mobile working machine.

BACKGROUND OF THE INVENTION

Vehicle drive-trains of mobile working machines, in particular wheel loaders, are more and more often made with continuously power-split transmission devices, usually equipped with a variator, a reversing transmission and range clutches. In the area of the transmission unit associated with the variator, spur gear stages or planetary stages are usually provided. Driving ranges within which a transmission ratio can be varied continuously by the variator are provided by the transmission unit. To carry out driving range changes, as a rule disk clutches are used as shifting elements. Moreover, the variator is often designed as a hydrostatic transmission with a hydrostatic unit consisting of a pump and a motor.

To change the transmission ratio of such a transmission device, for example starting from small transmission ratios toward larger transmission ratios, in each case one or more driving ranges are passed through and for this the hydrostatic unit correspondingly has to be swiveled across the full driving range several times. For example, if two complete driving ranges have to be passed through, then within a first driving range the hydrostatic unit operates to adjust the transmission ratio of the transmission unit continuously until the end of the driving range. Thereafter, two controlled range clutches coordinated with one another carry out a driving range change to the second driving range, which has a subsequent transmission ratio band, which is also passed through by means of the hydrostatic unit until the maximum transmission ratio has been reached.

When a wheel loader drives up a mound, the additional external load imposed on the drive-train, particularly the deceleration, increases in less than 0.5 seconds. The control rate or speed of change of the transmission ratio in the area of the transmission device is therefore disadvantageously too low to avoid unacceptably large falls of the rotational speed of the drive engine when driving onto a mound or suchlike. Owing to the high control rates of the hydrostatic unit required in combination with pause times to be maintained during a driving range change, new methods are needed in order to ensure the high level of dynamics required and also to protect the engine and the transmission.

DE 10 2013 215 520 A1 discloses a method for operating a power-split transmission device of a vehicle, whose transmission ratio can be varied continuously. The continuous adjustment of the transmission ratio in this case also takes place by way of a hydrostatic unit. A driving range change from a first driving range to a second driving range is carried out by switching over from a first range clutch associated with the first driving range to a second range clutch associated with the second driving range in accordance with a special control method which enables the driving range change to take place as comfortably as possible.

According to the generally known prior art, in a power-split transmission device the driving range change is carried out by means of range clutches, in that the range clutch for the new range is closed at the synchronous point or, usually, just before it. At the synchronous point the range clutch to be disengaged and the range clutch to be engaged no longer have a rotational speed difference between one another. When the new range clutch has been closed, the previous range clutch is opened again after a defined overlap time of the two clutches. During this overlap time the transmission ratio is at the synchronous point, so that during the overlap time the vehicle can only be decelerated by reducing the rotational speed of the engine.

The driving comfort and the productivity of a working machine, for example a wheel loader, are influenced essentially by the dynamics and quality of the driving range changes. In that regard it is vital for these to take place continuously and with a dynamic adapted to the driving situation. To determine the timing of the driving range change, it is usually calculated from the actual dynamic, the nominal dynamic and the distance of the transmission ratio at the time from the synchronous point, how long it is likely to be until the synchronous point is reached during a driving range change. Depending on the time interval so predicted, the new range clutch is pre-filled with hydraulic oil so that it can then be closed in accordance with a deceleration control logic that depends on the synchronous point. The synchronous point dependent deceleration control logic governs the further filling of the new range clutch in such manner that the mechanical loading of the clutch components is minimized and from the pre-filled condition the clutch can be closed as quickly and accurately as possible at the synchronous point. With the closing of the new range clutch the driving range change is active. If at that time the nominal transmission ratio has not yet reached the synchronous point, it is actively moved to the synchronous point. After that the transmission device can only produce lower or higher transmission ratios by means of the hydrostatic unit once the driving range change has been completed. The various driving range changes are linked to various gearwheel combinations in the transmission device. During the driving range change a defined overlap phase of the range clutches involved therein is maintained and only after the lapse of this overlap phase is the previous range clutch disengaged. Thereafter, the transmission ratio can be varied again.

For example, if the vehicle is to be decelerated, then in the normal case, i.e. in the absence of external disturbances, according to the sequence of the driving range change explained above, the change from a first, higher driving range FB2 with higher reciprocal transmission ratios to a second driving range FB1 with lower reciprocal transmission ratios is carried out by switching over from a correspondingly associated first range clutch to a second range clutch in accordance with the synchronous point dependent deceleration control logic. In this context reciprocal transmission ratio means the reciprocal of the value of the transmission ratio.

However, in a special situation such as when the vehicle drives up a mound, if an unexpected increase of the deceleration dynamic occurs at the beginning of the already initiated driving range change FBW from the first driving range FB2 to the second driving range FB1 then for the duration of this driving range change FBW the vehicle can only be decelerated by reducing the rotational speed of the drive engine. This may for example cause a Diesel engine to slow down to a sometimes unacceptable extent and, in the extreme case, to stall.

A further problem arises in that the time interval before the synchronous point is reached during the driving range change is calculated from the current actual or nominal dynamics. In doing this no account is taken of the fact that during the change the vehicle's dynamics could increase still further. In such a case the new range clutch would not yet be prepared in time by pre-filling and the driving range change FBW could only take place with some delay.

SUMMARY OF THE INVENTION

The object of the present invention is to provide a power-split transmission device and a method for operating it, which take into account an unexpected increase of the deceleration dynamic during a driving range change FBW in such manner that the vehicle drive-train is protected against unfavorable operating conditions.

These objectives are achieved by virtue of a power-split transmission and method as described below.

The invention includes the technical principle that the range clutch to be closed for the driving range change is controlled by a control unit in such manner that in the special situation of an unexpected increase of the deceleration dynamic at the beginning of an already initiated driving range change FBW from the first driving range FB2 to the second driving range FB1 the clutch is immediately compelled to bypass the synchronous point dependent deceleration control logic provided for the normal case. In other words, this means that when the special situation has been recognized, the first range clutch associated with the first driving range FB2 is closed at once and not in accordance with the slower clutch control logic applicable in the normal situation.

The result of this is that when the preparation of the new range clutch is too late because of an increased deceleration dynamic, as occurs for example when driving up a mound, a driving range change FBW is accelerated so that the time during which the transmission ratio remains at the synchronous point, and the drive engine is therefore slowed, are minimized, without interruption of the force locking. This leads to improved driving comfort and better control of the vehicle by the driver, without damaging the transmission device. Since therefore, compared with the normal case, the driving range change in this special situation is completed earlier, the transmission device can correspondingly change the transmission ratio earlier again to smaller reciprocal transmission ratios. This reduces the slowing of the engine accordingly.

Preferably, the range clutches involved in the driving range change FBW are in the form of hydraulically actuated disk clutches, whereas an electronic control unit controls the filling of the range clutches with hydraulic oil. In this context it is preferably provided that to initiate a driving range change FBW the control unit pre-fills the first range clutch FB2 with hydraulic oil in order to bring the clutch disks already into mutual contact without completing the friction locking of the clutch. By virtue of this clutch pre-filling the range clutch for the first driving range FB2 can be prepared in good time for the driving range change FBW, so that the change can be carried out accurately and with minimum delay.

According to a preferred embodiment of the invention, the control unit deduces the onset of the special case of an unexpected increase of the deceleration dynamic at the beginning of an already initiated driving range change FWB from a corresponding increase of the load on the drive engine. For example, however, other loads too are possible, and then such an increase of the deceleration dynamic is expressed by a marked additional engine load.

The control according to the invention of the range clutches for the driving ranges FB2 and FB1 involved in the driving range change FBW takes priority over the synchronous point dependent deceleration control logic in the normal case of a regular vehicle deceleration. The control unit prioritizes the corresponding control algorithms in an appropriate manner.

To achieve high driving comfort, it is proposed that the second range clutch is opened only after the lapse of an overlap time and a holding time that follows it if necessary, during which the first range clutch is also still closed. It is also possible that during the holding time the nominal current of the second range clutch is kept at zero. During the holding time the transmission ratio should not yet be adjusted, since owing to hydraulic delays the second range clutch can still be engaged. However, in the special situation the overlap time and if applicable the holding time can be reduced considerably compared with the normal situation, in order to achieve a particularly rapid and therefore drive-system-protecting driving range change FBW.

The driving range change FBW forced in accordance with the invention for a rapid downshift of the transmission device can be triggered by various conditions. For example, this can be determined from a difference between the calculated time interval until the synchronous point S for the driving range change FBW is reached, and an expected earlier arrival at the synchronous point S'. In this case it is recognized that the time until the driving range change FBW is decreasing more rapidly than was calculated at the time of clutch pre-filling and that therefore the synchronous point will be reached more quickly, whereby a driving range change FBW intended for the normal case of a regular vehicle deceleration would take place too late. Here, it can be distinguished whether the too-late condition has occurred already during the clutch pre-filling of the new range clutch for the first driving range FB2, or whether the condition was only fulfilled during a filling equalization stage that succeeded the pre-filling stage. If the forced clutch actuation is authorized already during the pre-filling stage, then after the end of the pre-filling stage the new range clutch for the first driving range FB2 is ramped up directly as a function of the rotational speed difference and the overlap time of the two range clutches is reduced. In addition the holding time that follows the overlap time of the range clutches could also be reduced. If a forced actuation of the range clutch is only permitted when it is in the filling equalization stage, then the driving range change FBW is carried out with reference to the synchronous point dependent deceleration control logic. This, however, takes place immediately without waiting until the time for reaching the originally forecast synchronous point S has lapsed.

According to other or alternative conditions, in the special situation of an unexpected increase of the deceleration dynamic at the beginning of an already initiated driving range change FBW, the driving range change FBW according to the invention can be determined from a number of deceleration dynamic parameters that characterize the corresponding load, such as:
- the actual drive output rotational speed gradient of the transmission device,
- the engine rotational speed gradient and the engine rotational speed level of the drive engine,
- the engine torque of the drive engine,
- the pressure in the hydrostatic unit, the decrease of the nominal reciprocal transmission ratio of the transmission device.

It is also conceivable that other characteristic parameters are considered for determining the triggering condition, provided that these characterize an unexpected increase of the deceleration dynamic that corresponds to the special case. From these parameters and with the help of threshold values triggering conditions can be defined, which indicate the onset of a special case. For example, this is so when the actual drive output rotational speed gradient and/or the engine rotational speed gradient fall(s) below a respectively defined threshold value.

To compensate inertia-related clutch delays when rapidly closing the range clutch for the first driving range FB2, in accordance with an invention-improving measure it is proposed that already shortly before the calculated synchronous point S is reached a threshold value SW for the triggering of the closing signal for the first range clutch is defined.

For the forced closing of the first range clutch for FB2 by the control unit to be permitted according to the invention, further boundary conditions can also apply, which prevent the range clutches for FB2 and FB1 involved in the driving range change FBW from being damaged or preventing the shift from having a negative effect on the driving comfort. For example, one of these is that the rotational speed difference in the range clutch to be shifted should be smaller than a specified limit value. In turn, the limit value depends on the deceleration dynamic. In addition, the transmission ratio must be within a defined band around the synchronous point S. In accordance with a further invention-improving measure, it can for example be chosen whether the forced clutch actuation should be triggered in the forward driving or reverse driving mode, or only in the forward mode. Furthermore, it is also possible to force an upshift in an analogous way.

Besides the deceleration dynamics parameters indicated above for defining a triggering condition for the driving range change FBW in the special case of interest here, other conditions too can apply in addition or alternatively. For example, it is possible that the special situation of an unexpected increase of the deceleration dynamic at the beginning of an already initiated driving range change FBW is determined from the outset of the occurrence that a reversing demand is made immediately after an upshift of the transmission. In that case a downshift should be carried out as soon as possible in order to achieve as rapid a vehicle reaction as possible.

Moreover, a detection of the position of the accelerator pedal and/or the brake pedal of the vehicle can also be taken into account, from which the information can be deduced that the driver of the vehicle wants to slow down. This indicates an increased probability that the special situation may arise.

Likewise, the current position of a lifting frame or a scoop of the vehicle, or of some other working equipment, can be detected by means of sensors in order, for example, to recognize a forthcoming ascent up a mound. Finally, the special case of an unexpected increase of the deceleration dynamic can also be concluded from the current driving situation. For example, the situations of driving on a road, driving up a mound, or even the loading of the vehicle can be taken into account for distinguishing whether a special case of interest in this context exists.

It is also possible for the driver to compel a change of the driving range by way of a rapid driving range change, by means of a kick-down switch. This is for example a knob on the driving switch or joystick, which the driver can actuate before starting off up the mound in order to manually force a downshift.

Let it be said again that the driving range change forced according to the invention, which replaces the normal deceleration control logic in the special case, can be permitted not only for a downshift but also for an upshift if, for example, after or during a downshift it is required to accelerate the vehicle again, or if the drive engine comes under heavy load, for example as the result of driving downhill.

The characteristic parameters indicated above and the conditions derived therefrom for triggering the forced, rapid clutch actuation, should be fulfilled at least for the most part. Alternatively, however, conditions can also be weighted so that a rapid clutch actuation forced in accordance with the invention is already authorized when one or more conditions weighted more heavily is/are fulfilled, whereas a condition with lower weighting is not yet fulfilled.

BRIEF DESCRIPTION OF THE DRAWINGS

Below, further measures that improve the invention are explained in greater detail with reference to the figures, together with the description of a preferred example embodiment of the invention, by comparison with the prior art. The figures show.

DETAILED DESCRIPTION OF THE PREFERRED EMBODIMENTS

Figure 1:
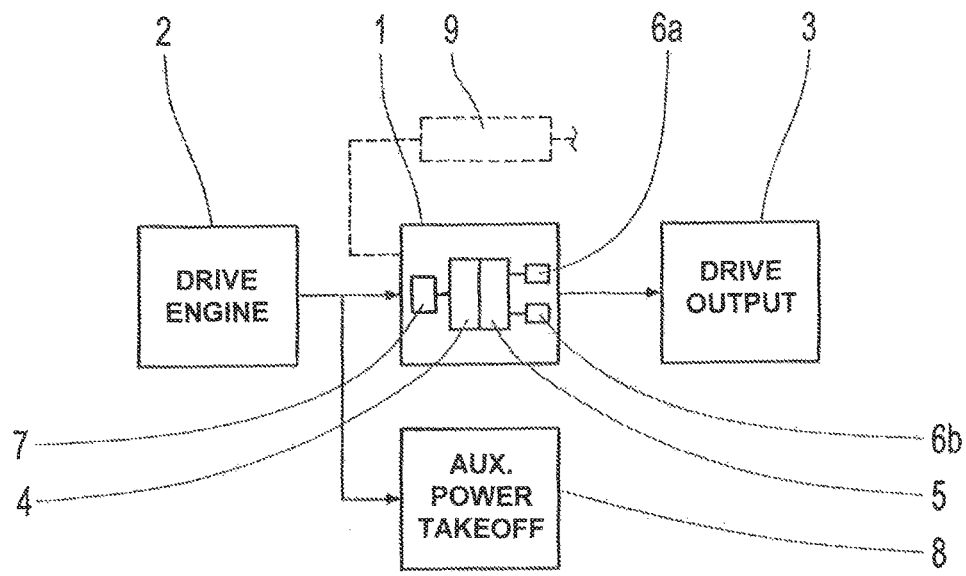
FIG. 1: A very schematic block circuit representation of a vehicle drive-train comprising a power-split transmission device according to the invention with a hydrostatic unit.

As shown in FIG. 1 a vehicle drive-train with a continuously variable power-split transmission arrangement 1 comprises a drive engine 2 connected thereto on the input side, which in this example embodiment is in the form of an internal combustion engine. On its output side the transmission device 1 is functionally connected to a drive output 3, whereby a drive torque produced by the drive engine 2 is transmitted in the area of the drive output 3, correspondingly converted as a function of the transmission ratio set in the transmission device 1, to produced a corresponding traction force.

The transmission device 1 comprises a hydrostatic unit 4 for the continuous adjustment of the transmission ratio, which cooperates with a transmission unit 5. The transmission unit 5 contains shiftable gearsets for various driving ranges, which can be in the form of planetary or spur gear stages. Two example range clutches 6a and 6b cooperate with the transmission unit 5, to couple the transmission ratio selected to the drive output 3. In addition, the transmission device 1 is equipped with a reversing clutch 7 for changing between forward and reverse driving of the vehicle.

Furthermore, in the context of the power-splitting an auxiliary power takeoff 8 is provided, which in this case is in the form of a working hydraulic system and is driven by means of the drive engine 2.

The transmission device 1 is designed, by means of an electronic control unit 9, to be operated in accordance with two different deceleration control logics. A first, synchronous point dependent deceleration control logic is active in the normal case of a regular vehicle deceleration and ensures a comfortable driving range change from a first driving range with higher reciprocal transmission ratio to a second driving range with lower reciprocal transmission ratio, by way of a switch-over—to be described in more detail below—between the first range clutch 6a and the second range clutch 6b.

The second deceleration control logic becomes active in the special situation of an unexpected increase of the deceleration dynamic at the beginning of a driving range change already initiated under the conditions of the above-mentioned normal case. If in such a case the filling of the driving range clutch for the new driving range has not yet been started by the synchronous point dependent deceleration control logic, then it can also be triggered by the logic of the forced shift. In this special case the range clutches 6a, 6b involved are actuated in accordance with a different deceleration control logic, which compels an immediate driving range change. This special case of an unexpected increase of the deceleration dynamic can for example occur when the vehicle drives up a mound, i.e. during a so-termed mound drive.

Figure 2:
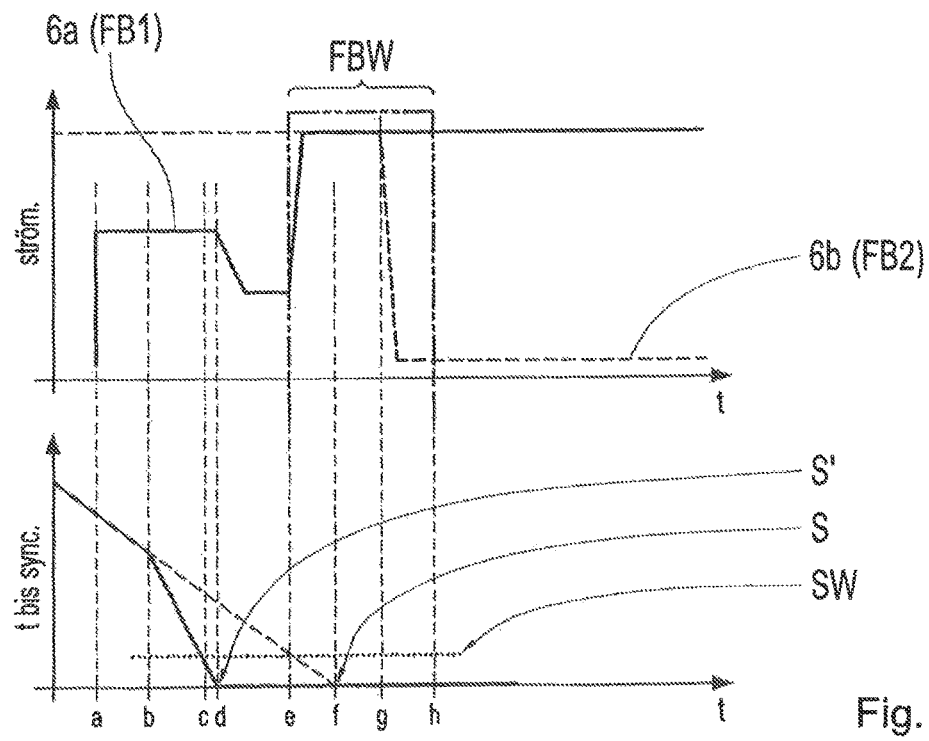
FIG. 2: A diagram to illustrate a driving range change in accordance with a synchronous point dependent deceleration control logic, as in the prior art.

FIG. 2 illustrates the driving range change FBW already known from the prior art during the course of the normal case of a regular vehicle deceleration. At time-point a the probable time-point f until the synchronous point S is reached is determined on the basis of the current dynamic. The parameter "sync." plotted on the vertical axis is the calculated time interval until the synchronous point is reached. If this time is zero, the synchronous point S at which a smooth driving range change FBW can be carried out has been reached.

At the same time, at time-point a the clutch pre-filling of the first range clutch 6a of the first driving range FB2 is started, as shown by the rise of the graph along the vertical axis "ström". In this upper part of the figure the time variation of the clutch flows of the range clutches 6a and 6b are shown. The closing flows of the two clutches must not lie at the same level. The clutch pre-filling between times a and e ensures that the clutch disks of the range clutch 6a have already come into mutual contact without the clutch exerting its friction-locking force. Between time-points d and e a ramping down to filling equalization takes place along with filling equalization. This ensures that the range clutch 6a is ready to close even before the synchronous point S has been reached.

The range clutch 6a is closed as soon as the fall to below the threshold value SW has taken place. That is the time-point e.

When the range clutch 6a closes at time-point e, the driving range change FBW is active. After this, the transmission device can only set other transmission ratios again at time-point h. After a defined overlap phase of the two range clutches 6a and 6b between time-points e to g, the old range clutch 6b is disengaged. In addition the driving range change FBW is still kept active for a short time until it is certain that the range clutch 6b being opened is no longer transmitting any torque, so that the driving range change FBW has been fully completed after the lapse of this holding time, at time-point h. The transmission ratio can now be varied again in the new driving range FB2 obtained by downshifting.

However, otherwise than in the normal case described above, if in a special case at time-point b there occurs a marked increase of the deceleration dynamic, then the synchronous point S' would be reached earlier than anticipated by the original calculation of the synchronous point S. At this time-point b, however, the range clutch 6a is not yet prepared for the driving range change FBW, but rather, it is still in the pre-filling phase. As a result, the conventional synchronous point dependent deceleration control logic would enable the completion of the driving range change FBW only at time-point h, since the synchronous point dependent deceleration control logic does not react to interim changes of the deceleration dynamic.

Figure 3:
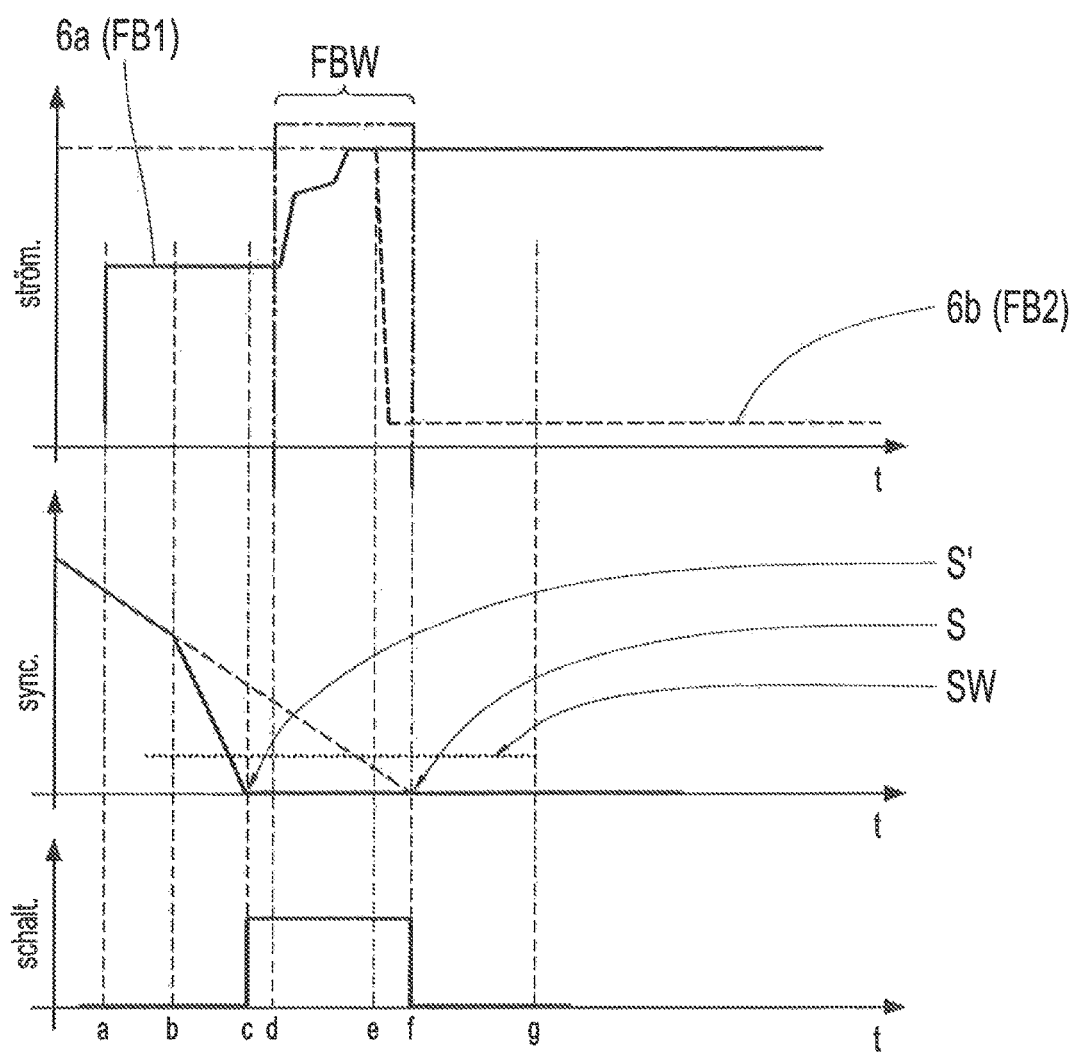
FIG. 3: A diagram to illustrate a driving range change during the course of a forced rapid driving range change according to the present invention.

FIG. 3 illustrates the solution according to the invention for the onset of a special situation when there is an unexpected increase of the deceleration dynamic at the beginning of an already initiated driving range change FBW. Here too, by virtue of the nominal and actual transmission ratios of the transmission device and their gradients, it is detected at time-point a that the first range clutch 6a must be pre-filled. At time-point b the deceleration dynamic now increases markedly, so that the synchronous point S' or its threshold value SW for the timely activation of the range clutch 6a is reached already at time-point c. Accordingly, the desire for a shift occurs at time-point c, as shown in the "schalt" diagram. This takes place earlier than the time-point g originally calculated for the synchronous point S in the normal case. At the time-point b, the pre-filling of the range clutch 6a has not yet finished; however, since the conditions for the special case to trigger a forced driving range change FBW are fulfilled, as soon as possible according to "schalt", i.e. as soon as the rapid filling has ended at time-point d, the further filling equalization is abandoned and the range clutch 6a for the driving range FB2 is ramped up directly as a function of the rotational speed difference, with effect at time-point e. Thus, this can take place at the same time-point as the earlier synchronous point S'. It is also possible that S' does not coincide with the closing of the clutch.

Between time-points e and f there follows an overlap time of the clutches 6a and 6b, which is shorter compared with the normal case, after which the range clutch 6b of the old driving range FB1 is opened. The overlap time of the range clutches does not necessarily have to be made shorter. This event can be expected long before the time-point h. Thus, the driving range change has completely finished already by time-point g and the transmission ratio can be changed again to smaller reciprocal transmission ratios. By virtue of the solution according to the invention, therefore, after the onset of the special situation the interval between time-points g and h until the driving range change FBW can be omitted, in order to minimize the slowing of the engine. Depending on the driving situation, the threshold value can be adapted for the triggering of a forced shift.

The method, described for the cake of a downshift, can also be used in the reverse sequence for upshifts.

INDEXES

1 Transmission device
2 Drive engine
3 Drive output
4 Hydrostatic unit
5 Transmission unit
6 Range clutch
7 Reversing clutch
8 Auxiliary power takeoff
9 Control unit FBW Driving range change
FB2 First driving range
FB1 Second driving range
S Synchronous point
SW Threshold value

The invention claimed is:

1. A power-split transmission device for a vehicle, designed to connect a drive engine, arranged on an input side, to a drive output, arranged on an output side, the power-split transmission device comprising:
   a hydrostatic unit for continuous adjustment of a transmission ratio at a transmission unit, and
   at least first and second range clutches that cooperate with the transmission unit and are substantially operated in alternation for respectively associated first and second driving ranges with different transmission ratios,
   a control unit, in a normal case of a regular vehicle deceleration, implements a driving range change from the first driving range, with higher reciprocal transmission ratios, to the second driving range, with lower reciprocal transmission ratios, by switching over from the first range clutch to the second range clutch in accordance with a synchronous point dependent deceleration control logic, and
   in a special case of an unexpected increase of a deceleration dynamic at a beginning of an already initiated driving range change, from the first driving range to the second driving range, the control unit immediately forces the change by bypassing the synchronous point dependent deceleration control logic.

2. The power-split transmission device according to claim 1, wherein the first and the second range clutches are hydraulically actuated disk clutches, and the control unit controls a supply of hydraulic oil to the first and the second range clutches.

3. The power-split transmission device according to claim 2, wherein to initiate a driving range change, the control unit pre-fills the first range clutch with hydraulic oil, in order to bring clutch disks of the first range clutch already into mutual contact without producing friction locking of the first range clutch.

4. The power-split transmission device according to claim 1, wherein the control unit deduces an existence of the special case of the unexpected increase of the deceleration dynamic at the beginning of the already initiated driving range change, from a corresponding increase in loading of the drive engine.

5. A method of operating a power-split transmission device for a vehicle which connects a drive engine, arranged on an input side, to a drive output, arranged on an output side, and has a hydrostatic unit for continuous adjustment of a transmission ratio at a transmission unit, and at least first and second range clutches that cooperate with the transmission unit and are substantially operated, in alternation, for respectively associated first and second driving ranges with different transmission ratios, and a control unit that, in a normal case of a regular vehicle deceleration, implements a driving range change from a first driving range, with higher reciprocal transmission ratios, to a second driving range, with lower reciprocal transmission ratios, by switching over from the first range clutch to the second range clutch, the method comprising process steps of:
   a) determining a time interval before reaching a synchronous point for the driving range change,
   b) pre-filling of the first range clutch with hydraulic oil,
   c) in the normal case of a still regular vehicle deceleration, the driving range change is completed by completely engaging the first range clutch in accordance with a synchronous point dependent deceleration control logic, whereas
   d) in a special case of an unexpected increase of a deceleration dynamic at a beginning of an already initiated driving range change, the first range clutch is immediately engaged thereby bypassing the synchronous point dependent deceleration control logic.

6. The method according to claim 5, further comprising keeping the second range clutch closed until a lapse of an overlap time in which the first range clutch is also still closed.

7. The method according to claim 6, further comprising for the force driving range change triggered as a result of the special case, reducing at least one of an overlap time of the first and the second range clutches and a subsequent holding time in comparison with an overlap time and holding time specified for the normal case.

8. The method according to claim 5, further comprising determining the special case of an unexpected increase of the deceleration dynamic at the beginning of an already initiated driving range change from a deviation of a calculated time interval for reaching the synchronous point for the driving range change and an expected earlier arrival at the synchronous point.

9. The method according to claim 5, further comprising determining the special case of an unexpected increase of the deceleration dynamic at the beginning of an already initiated driving range change from a plurality of characteristic deceleration dynamics parameters that characterize corresponding external loading, and the plurality of characteristic deceleration dynamics parameters comprising:
   an actual drive output rotational speed gradient of the transmission device,
   at least one of an engine rotational speed gradient and a rotational speed of the drive engine,
   an engine torque of the drive engine,
   a pressure in the hydrostatic unit, and
   a decrease of a nominal reciprocal transmission ratio of the transmission device (1).

10. The method according to claim 5, further comprising, before reaching the synchronous point, defining a threshold value for the closing of the first range clutch, beyond which the first range clutch receives the closing signal, in order to compensate for inertia-related clutch delay, such that the threshold value is adaptable in accordance with the driving situation.

11. The method according to claim 5, further comprising determining the special case of the unexpected increase of the deceleration dynamic at the beginning of the already initiated driving range change from an onset of an occurrence of a reversing demand immediately before an upshift of the transmission device.

12. The method according to claim 5, further comprising determining the special case of the unexpected increase of the deceleration dynamic at the beginning of the already initiated driving range change from a detection of a position of at least one of an accelerator pedal and a brake pedal of the vehicle.

13. The method according to claim 5, further comprising determining the special case of the unexpected increase of the deceleration dynamic at the beginning of the already initiated driving range change from a detection by a sensor of a current position of either a lifting frame or a scoop of the vehicle, in order to recognize a forthcoming drive up a mound.

14. The method according to claim 5, further comprising determining the special case of the unexpected increase of the deceleration dynamic at the beginning of the already initiated driving range change from a current condition of the vehicle selected from the group comprising:
  driving on a road,
  driving up a mound, and
  a loading condition of the vehicle.

\* \* \* \* \*